United States Patent Office 3,398,764
Patented Aug. 27, 1968

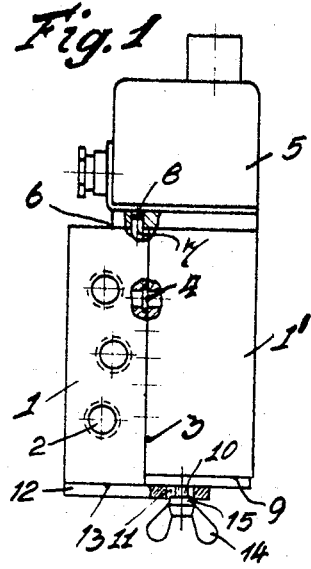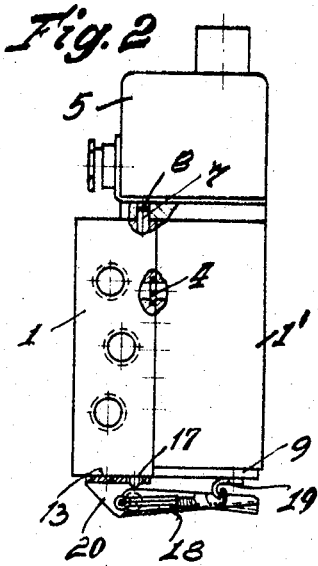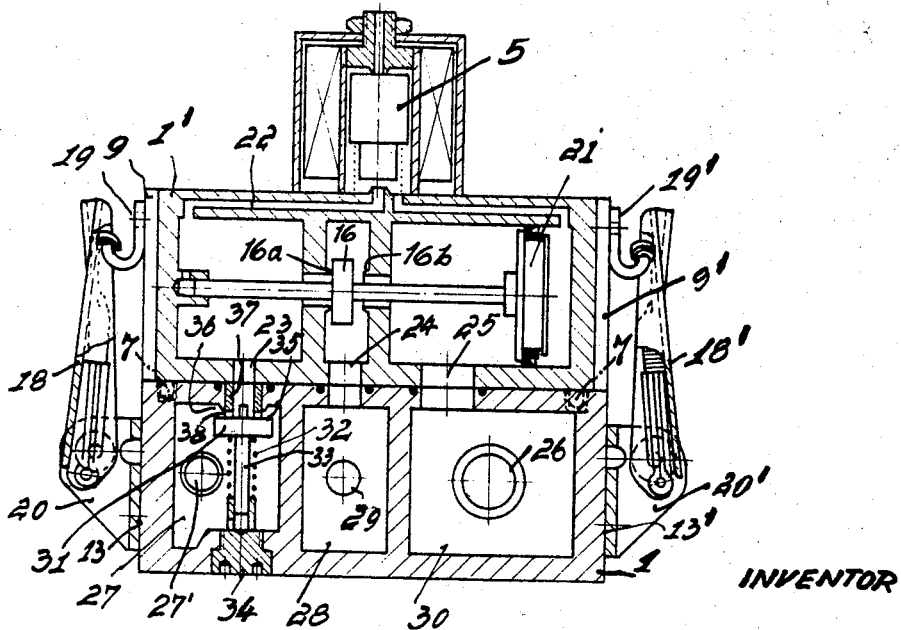

3,398,764
SWITCH VALVE, ESPECIALLY MAGNET VALVE WITH SUB-DIVIDED HOUSING PARTS WHICH ARE DETACHABLE FROM EACH OTHER
Erich Herion, Distlerstrasse 22,
Stuttgart-Frauenkopf, Germany
Continuation of application Ser. No. 431,249, Feb. 9, 1965. This application Jan. 22, 1968, Ser. No. 699,741
8 Claims. (Cl. 137—614)

ABSTRACT OF THE DISCLOSURE

A control valve having a base portion provided with an inlet and two outlets for connection to a source of pressure fluid, to a return line, and to the hydraulic apparatus controlled by the valve, and a cover portion enclosing the working elements of the valve. When the cover portion is secured to the base portion, three orifices of the cover portion are sealingly engaged with three orifices on the base portion, two of which are connected by permanently open compartments with the outlets of the base portion. A normally closed check valve between the third orifice and the inlet of the base portion is opened when the cover portion is set on the base portion. The two portions are attached to each other by manually releasable fasteners.

---

This application is a continuation of Serial No. 431,249 filed Feb. 9, 1965, and now abandoned.

The present invention relates to control valves, and particularly to valves having a split casing, a base portion of the valve being normally fixedly mounted and permanently connected to conduits, and a cover portion of the valve containing the movable operating parts. Engaged contact faces of the two portions are provided with sealingly engaged orifices for fluid flow between the two valve portions.

The operating parts of such a valve may be replaced by releasing the cover portion from the base portion without disconnecting the valve from associated conduits and by substituting another cover portion. The valve may also readily be deactivated by removing the cover portion and plugging the orifices in the base portion.

Conventional valves of the type described are assembled by screw connections and other fastenings which cannot be released without loss of much time. It is an object of this invention to simplify the separation of the cover portion from the base portion, and to permit the separation to be carried out quickly, and preferably without tools. The quick disassembly of the valve is particularly advantageous in installations including a large number of valves which must be maintained quickly and effectively.

According to this invention, the two portions of a valve of the type described are connected by a locating pin on one of the valve portions which releasably engages a recess formed in the other valve portion. Manually releasable locking means are provided for holding the pin engaged with the recess.

Other features and many of the attendant advantages of this invention will readily become apparent from the following detailed description of preferred embodiments when considered in connection with the accompanying drawings in which:

FIG. 1 shows a valve of the invention in side elevation, a portion of the casing being broken away to reveal internal structure;

FIG. 2 shows another valve of the invention in a view corresponding to that of FIG. 1; and FIG. 3 illustrates yet another embodiment of the invention in elevational section.

Referring initially to FIG. 1, there is shown a valve of the invention whose base portion 1 is normally fixedly mounted and connected to conduits, not shown, which engage inlets or outlets 2 in the base portion 1. A contact face 3 of the base portion 1, which is vertical in the illustrated position of the valve, is sealingly engaged by a corresponding face of the cover portion 1' which encloses the movable valve elements as will be described in more detail with reference to FIG. 3. Matingly sealed orifices 4 in the contact faces of the two valve portions 1, 1' permit fluid flow between the inlets or outlets 2 and the cover portion 1'. A solenoid-operated pilot valve 5 mounted on the cover portion 1' controls the movable valve elements, not shown in FIG. 1.

The top part of the cover portion 1' overlaps the base portion 1 so that the two portions are in abutting engagement along horizontal contact faces 6. A locating pin 7 on the base portion 1 projects upward from the faces 6 into a recess 8 in the cover portion 1'. A bracket 12 projects horizontally beyond a bottom face 13 of the base portion 1 and has an oversized opening 11 engaged by a threaded pin 10 downwardly extending from the bottom face 9 of the cover portion 1'. A wing nut 14 on the pin 10 has an upwardly tapering conical portion 15 which centers the pin 10 in the opening 11 when the nut 14 is tightened.

The two valve portions are disengaged by releasing the wing nut 14 and lifting the cover portion 1' from the pin 7 and the bracket 12. The valve portions are assembled by reversing these steps.

In the embodiment of the invention illustrated in FIG. 2, the valve portions 1, 1', generally identical with those described with reference to FIG. 1, are secured to each other by locating pin 7 engaging a recess 8 as described above, and by a toggle catch arrangement including a toggle lever 18 pivotally attached to a bracket 20 rotatably mounted on the bottom face 13 of the base portion 1 by a pin 17. The lever engages a hook 19 on the bottom face 9 of the cover portion 1'.

The embodiment of the invention shown in FIG. 3 does not rely on two pairs of engaged contact faces offset at right angles for partly locating the cover portion of a valve on the associated base portion, but is provided with two centering pins 7 on the single horizontal contact face of the cover portion 1' which engage recesses in a corresponding contact face of the base portion 1. Opposite vertical faces 9, 9' of the cover portion 1' are aligned with opposite vertical faces 13, 13', and toggle levers 18, 18' pivotally mounted on brackets 20, 20' on the faces 13, 13' releasably engage respective hooks 19, 19' on the faces 9, 9', thereby locking the cover portion 1' to the base portion 1 in a relative position defined by the centering pins 7.

The operating elements of the valve enclosed in the cover portion 1' include a piston 21 which was shifted toward the left, as viewed in FIG. 3, by pressure fluid admitted through a duct 22 controlled by the pilot valve 5 in a known manner. The duct 22 permanently communicates with an orifice 23 of the cover portion 1' through which the controlled pressure fluid enters the cover portion 1' from a compartment 27 in the base portion 1. The cover portion further communicates with the base portion 1 through orifices 24, 25, the latter being connected with a return line (not shown) through an outlet 26 in a compartment 30 of the base portion.

The orifice 24 communicates in the illustrated assembled condition of the valve with a compartment 28 in the base portion 1 whose outlet 29 is normally connected with the device whose fluid supply is to be controlled by the valve. The compartment 28 is connected with the compartment 30 and the return line in the illustrated position of a valve disc 16 fixedly mounted on the piston 21 for movement between two valve seats 16a, 16b respectively communicating with the orifices 23, 25. When the duct 22 is vented by the pilot valve 5, the piston 21 is moved toward the right, as viewed in FIG. 3, by the pressure of the controlled fluid on the disc 16 at the seat 16a, whereby the disc is shifted to close the seat 16b, and the controlled outlet 29 is connected to the pressure fluid inlet 27' in the compartment 27 of the base portion 1 by the orifice 23.

A check valve arrangement is provided to prevent escape of fluid under pressure from the compartment 27 while the cover portion 1' is removed. The check valve includes a valve member 31 mounted on a stem 33 which is coaxially enveloped by a helical compression spring 33. The spring abuts against the valve member 31 and a plug 34 threadedly inserted in the base portion 1 and provided with a bore in which the stem 33 is guided.

The spring 32 urges a flat face 35 of the valve member 31 toward engagement with an annular valve seat 36 about an opening in the base portion 1 which is aligned with the orifice 23 of the cover portion 1'.

A tube 37 is coaxially fastened to the face 35 and extends through the opening in the base portion 1 into abutting engagement with the contact face of the cover portion 1' about the orifice 23. In the illustrated position of the valve, the free end of the tube 37 is flush with the contact face of the base portion 1, and radial bores 38 in the tube adjacent the face 35 permit fluid flow from the compartment 27 through the orifice 23 into the cover portion 1'. When the cover portion 1' is released from the base portion 1, the valve member 31 engages the seat 36 and seals the compartment 27.

I claim:
1. In a valve, in combination:
   (a) a base member;
   (b) a cover member;
   (c) inlet means and two outlet means on said base member for connecting the base member to respective conduits,
      (1) said members being each formed with three orifices simultaneously alignable with the corresponding orifices of the other member for flow of fluid between said members;
   (d) conduit means in said base member connecting said outlet means with two of the orifices of said base member respectively;
   (e) check valve means operatively interposed between said inlet means and the third orifice of said base member, said check valve means being normally closed;
   (f) means in said cover member for controlling flow between the orifices of said cover member;
   (g) fastening means securing said members to each other in a position in which said orifices of the same are sealed to each other in alignment, said fastening means including
      (1) locating means on each of said members and engageable with each other for holding said members in said position, and
      (2) manually releasable locking means on said members for holding said locating means in engagement; and
   (h) valve opening means responsive to movement of said members into said position thereof for opening said check valve means to flow of fluid between said inlet means and said third orifice.

2. In a valve as set forth in claim 1, said locating means including a locating pin on one of said members and a recess on the other member adapted to receive said pin.

3. In a valve as set forth in claim 1, said conduit means including two permanently open conduits respectively connecting said two orifices of the base member with said outlet means.

4. In a valve as set forth in claim 1, said locking means including a toggle lever on one of said members and hook means on the other member engageable by said toggle lever.

5. In a valve as set forth in claim 1, said locking means including bracket means projecting from one of said members and formed with an opening therein, threaded pin means projecting from the other member and extending through said opening when said members are secured to each other, and a nut on said threaded pin means.

6. In a valve as set forth in claim 1, said check valve means including a valve member movable in said base member toward and away from said third orifice, and yieldably resilient means urging said valve member to move toward said orifice for blocking the same, and said valve opening means including a valve actuating member connected to said valve member for joint movement therewith, said valve actuating member normally projecting from said base member through said third orifice.

7. In a valve as set forth in claim 6, said valve actuating member being tubular about an axis extending in the direction of movement thereof, said actuating member being fastened to said valve member and being formed with a radial opening adjacent said valve member.

8. In a valve as set forth in claim 7, said base member including an annular valve seat about said third orifice, said yieldably resilient means urging said valve member into sealing engagement with said valve seat.

References Cited
UNITED STATES PATENTS

| | | | |
|---|---|---|---|
| 2,634,086 | 4/1953 | Johns | 137—625.64 |
| 3,062,236 | 11/1962 | Ludwig | 137—675.69 |
| 3,076,473 | 2/1963 | Wadey | 137—271 XR |
| 3,126,915 | 3/1964 | Hunt | 137—625.64 XR |
| 3,170,579 | 2/1965 | Popelier | 137/383 XP |

M. CARY NELSON, *Primary Examiner.*

ROBERT J. MILLER, *Assistant Examiner.*